United States Patent
Tin

(10) Patent No.: US 8,794,997 B2
(45) Date of Patent: Aug. 5, 2014

(54) WALL OUTLET TYPE USB HUB WITH INDEPENDENT CHARGING FUNCTION

(71) Applicant: Kyohaya Technology Ltd., New Taipei (TW)

(72) Inventor: Jane Pin Tin, New Taipei (TW)

(73) Assignee: Kyohaya Technology Ltd., New Taipei (TW)

( * ) Notice: Subject to any disclaimer, the term of this patent is extended or adjusted under 35 U.S.C. 154(b) by 26 days.

(21) Appl. No.: 13/790,937

(22) Filed: Mar. 8, 2013

(65) Prior Publication Data

US 2013/0267116 A1    Oct. 10, 2013

(30) Foreign Application Priority Data

Apr. 6, 2012   (TW) .............. 101206207 A

(51) Int. Cl.
| | |
|---|---|
| *H01R 13/60* | (2006.01) |
| *H01R 25/00* | (2006.01) |
| *H02J 1/00* | (2006.01) |
| *H02J 7/00* | (2006.01) |

(52) U.S. Cl.
CPC ............. *H01R 25/006* (2013.01); *H02J 7/0052* (2013.01); *H02J 2007/0062* (2013.01); *H02J 1/00* (2013.01)
USPC ......................................... 439/535

(58) Field of Classification Search
USPC .................................. 439/535, 536
See application file for complete search history.

(56) References Cited

U.S. PATENT DOCUMENTS

| | | | | |
|---|---|---|---|---|
| 6,423,897 | B1 * | 7/2002 | Roesch et al. | 174/50 |
| 6,617,511 | B2 * | 9/2003 | Schultz et al. | 174/53 |
| 7,425,677 | B2 * | 9/2008 | Gates et al. | 174/50 |
| 8,158,883 | B2 * | 4/2012 | Soffer | 174/50 |
| 8,221,158 | B2 * | 7/2012 | Liao | 439/535 |
| 2013/0244475 | A1 * | 9/2013 | Sayadi et al. | 439/501 |
| 2013/0267116 | A1 * | 10/2013 | Tin | 439/535 |

* cited by examiner

*Primary Examiner* — Phuong Dinh
(74) *Attorney, Agent, or Firm* — Rabin & Berdo, P.C.

(57) ABSTRACT

A wall outlet type USB hub with independent charging function includes a mounting case and a combined USB hub and socket unit. The mounting case includes a rear case portion for mounting on a wall and a front case portion assembled to a front opening of the rear case portion. The combined USB hub and socket unit includes a housing member held in the mounting case via retaining means and having multiple openings; a printed circuit board located inside the housing member and having a power module and a hub module; multiple data transfer ports electrically connected to the hub module and aligned with the openings on the housing member; and a power connector electrically connected to the power module. The wall outlet type USB hub matches general wall outlet's cover plate specification and can replace existing AC wall outlet to enable both data transmission and DC power supply functions.

12 Claims, 8 Drawing Sheets

WALL OUTLET TYPE USB HUB WITH INDEPENDENT CHARGING FUNCTION

FIELD OF THE INVENTION

The present invention relates to a USB wall outlet mounted to a predetermined location on a wall, and more particularly to a wall outlet type USB hub with independent charging function that provides both DC power supply function and USB hub data transmission function.

BACKGROUND OF THE INVENTION

The universal serial bus (USB) is a transmission standard developed in 1994, it supports plug and play as well as hot plugging, and allows removal or unplugging of a device without the need of executing complicated applications. The USB also enables higher transmission rate than other types of buses, and is therefore more convenient for use compared to other buses.

The USB has already become a main specification for transmission. Currently, almost all kinds of computer peripherals, such as external hard drives, printers, mice, keyboards and so on, use a USB connector to connect with a computer. The USB interface provides a uniform connector for various peripherals, including power supply interfaces, communication interfaces, video output devices, audio input devices, data storage devices and the like. All these devices use the same USB interface specifications. However, since most currently available peripherals use USB sockets and plugs, the USB ports provided on a computer host, such as the desktop computer host or the notebook computer host, are not sufficient in number now.

To solve the problem of insufficient USB ports on computers, there is developed a USB hub, to which more devices can be connected. The USB hub has a unit electrically connected to a USB plug and a plurality of USB ports. When the USB plug is plugged in a USB port on a host system, such as a computer host, power can be supplied to all the USB ports of the USB hub from the computer, so that multiple peripherals can be connected to the USB ports on the USB hub to solve the problem of insufficient USB ports on the computer host.

Another fact is that more and more battery-powered portable devices have been developed in recent years, such as smartphones, MP3/4/5, tablet computers, power banks, card readers, digital cameras and so on. Users usually wish to use these portable devices to transmit data at any time and any place while charging the devices synchronously.

However, the conventional USB hub is mainly designed to provide more USB ports for connecting more devices to a host system via the USB hub, so that these devices can work with the computer host to enable data transmission between them at the same time. The conventional USB hub must be connected to a power supply inside the computer to obtain required power for maintaining its normal operation. That is, the conventional USB hub itself does not provide any power source for operating independently. In the case too many devices are connected to the ports on the USB hub, the USB hub would encounter the condition of insufficient voltage, which would cause difficulties in data transmission, data storage or device charging. In worse conditions, the computer system might be overloaded and become crashed, and the USB hub would also become damaged.

To overcome the above problems, there is developed an external USB hub that can be connected to an AC wall outlet that supplies mains electricity. Since the USB hub must be externally connected to the conventional AC wall outlet for use, it is subjected to damaged pins due to frequent plugging and unplugging of the pins into and from the AC wall outlet. Further, the currently commercially available USB hub externally connected to the AC wall outlet is raised from a cover plate of the AC wall outlet and accordingly, would cause inconvenience in use.

It is therefore desirable to develop an improve USB hub, which can be provided with sufficient power supply to avoid damage thereto and has an appearance design that is esthetic and allows convenient use of the USB hub.

SUMMARY OF THE INVENTION

A primary object of the present invention is to provide a wall outlet type USB hub with independent charging function. That is, the present invention provides a wall outlet that is also a USB socket providing both hub function and charging function, so that multiple 3C (communication, computer and consumer) products connected to the wall outlet type USB hub are linkable to one another for data transmission and can be charged with DC power at the same time. Therefore, the wall outlet has increased usability.

Another object of the present invention is to provide a USB hub with independent charging function that matches the specification of a cover plate for the wall outlet in general residential and office buildings, and can therefore be directly mounted in a cavity behind the cover plate of an existing AC wall outlet to replace the same without the need of additionally designing a particular cover plate for it. Thus, the wall outlet type USB hub of the present invention provides largely upgraded convenience in use.

A further object of the present invention is to provide a wall outlet type USB hub that provides multiple sockets or ports having different specifications, and is therefore usable with various kinds of 3C products of different connection specifications.

To achieve the above and other objects, the wall outlet type USB hub according to the present invention is configured for mounting on a wall at a predetermined location, and includes a mounting case and a combined USB hub and socket unit. The mounting case includes a rear case portion and a front case portion. The rear case portion is mounted to the predetermined location on the wall and has a peripheral wall, which encloses a receiving space therein and defines at a front side thereof a first opening facing toward an outer side of the wall. The front case portion is assembled to the first opening of the rear case portion and has a second opening, which is defined at a central area of the front case portion to communicate with the first opening.

The combined USB hub and socket unit is held in the receiving space of the rear case portion, and includes a housing member, a printed circuit board (PCB), a plurality of data transfer ports, and a power connector. The housing member is provided on a front side with a plurality of openings and on lateral outer sides with retaining means for holding it to the mounting case. The PCB is located inside the housing member and includes a power supply module and a hub module. The power supply module includes a DC/AC converter circuit, and the hub module includes a signal transmission circuit and a power transmission circuit, which is electrically connected to the DC/AC converter circuit. The data transfer ports are located inside the housing member and forward aligned with the openings formed on the front side of the housing member, and are electrically connected to the hub module on the PCB. The power connector is similarly located inside the housing member, and is electrically connected at an end to the PCB. The other end of the power connector is electrically connected to power wires embedded in the predetermined location on the wall.

In a preferred embodiment of the present invention, the predetermined location on the wall is a recessed area receded from the wall's surface and having a front opening, and the rear case portion is mounted in the recessed area with a back side of the front case portion attached to the wall's surface. In another preferred embodiment of the present invention, the predetermined location is a flush surface on the wall, and the rear case portion is fixed onto the flush surface with the whole mounting case raised from the wall's surface.

In an operable embodiment of the present invention, the data transfer ports can be USB ports, mini USB ports, micro USB ports, or any combination thereof; and the retaining means are located between the second opening of the front case portion and the lateral outer sides of the housing member. The retaining means include a plurality of slots formed on inner sides of the front case portion facing toward the second opening, and a plurality of protrusions formed on the lateral outer sides of the housing member corresponding to the slots. Moreover, the slots include two sets of differently sized slots, which are alternately arranged along the inner sides of the front case portion; and the protrusions include two sets of differently sized protrusions, which are alternatively arranged along the lateral outer sides of the housing member corresponding to the differently sized slots.

The mounting case for the present invention may further include a cover plate for covering the second opening of the front case portion. The cover plate is provided with a plurality of windows, which match and are communicable with the openings on the front side of the housing member. The front case portion and the cover plate together give the wall outlet type USB hub of the present invention a flush front surface and accordingly an esthetic overall appearance.

In addition, the combined USB hub and socket unit further includes at least one light-emitting element, which is located inside the housing member and forward aligned with at least one of the openings formed on the front side of the housing member. The light-emitting element is electrically connected to the PCB for indicating whether the wall outlet type USB hub is currently in an energized state and whether there is any other electronic device connected to one of the data transfer ports that serves as a host.

In brief, the present invention is characterized by having a structural design that includes a housing member usable with a cover plate that has a specification for general AC wall outlets, and a power module and a hub module provided on a printed circuit board received in the housing member. The wall outlet type USB hub with these arrangements is very practical for use because, once it is mounted to the predetermined location on the wall and connected to external power wires, different 3C products can be connected to the data transfer ports thereof for charging and data transmission at the same time.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
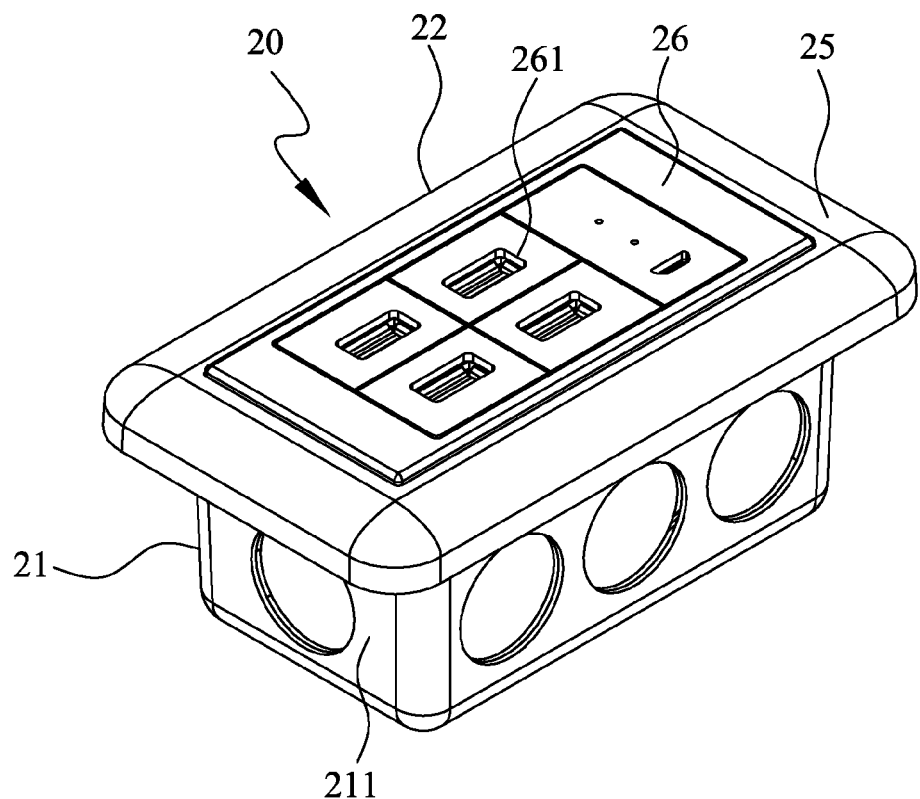
FIG. 1 is an assembled perspective view of a wall outlet type USB hub according to a first preferred embodiment of the present invention.
Figure 2:
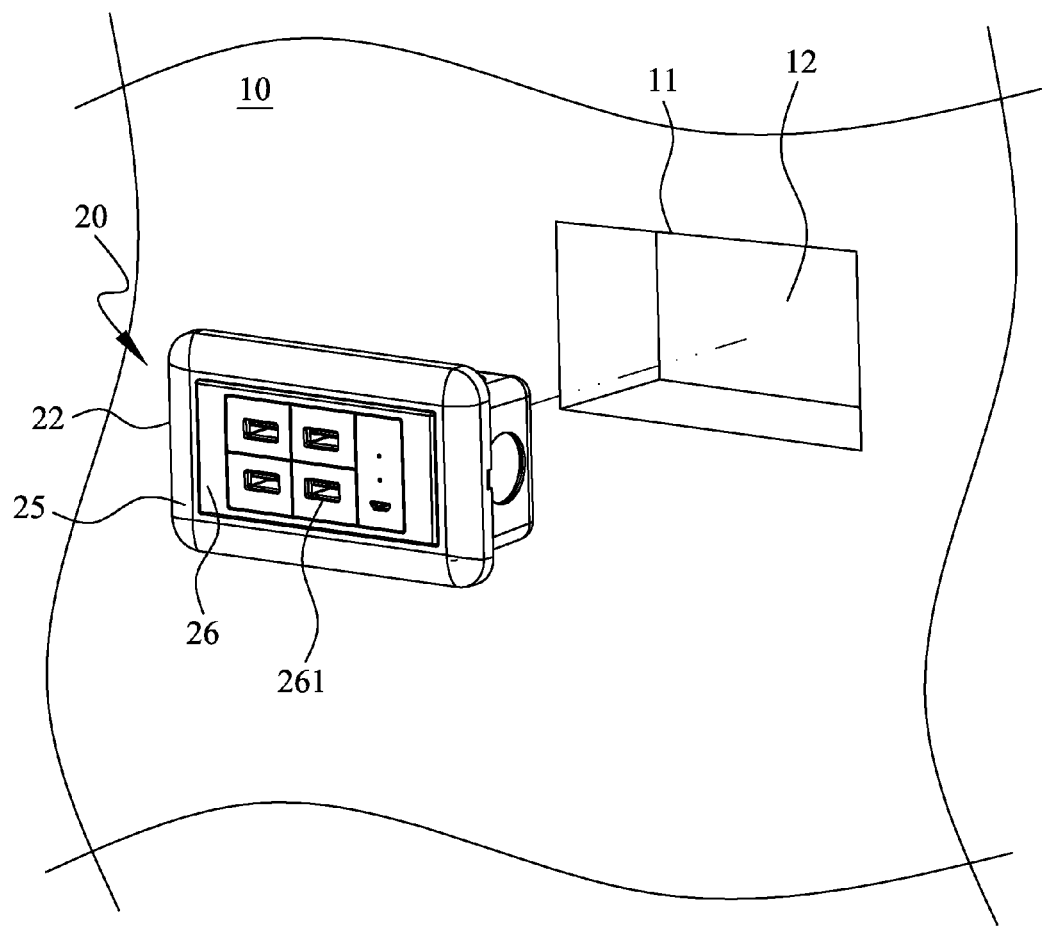
FIG. 2 shows the first preferred embodiment of the present invention is to be mounted in a predetermined recessed area on a wall.

The present invention will now be described with some preferred embodiments thereof and with reference to the accompanying drawings. For the purpose of easy to understand, elements that are the same in the preferred embodiments are denoted by the same reference numerals.

Please refer to FIGS. 1 to 4, in which a wall outlet type USB hub with independent charging function according to a first preferred embodiment of the present invention is shown. For the purpose of conciseness and clarity, the present invention is also briefly referred to as "the wall outlet type USB hub" herein. As shown, the wall outlet type USB hub according to the first preferred embodiment is configured for mounting to a predetermined location 11 on a wall 10 in most general residential or office buildings. Please refer to FIG. 2. The predetermined location 11 is a recessed area 12 receded from the wall's surface and having a front opening. The recessed area 12 is internally provided with power wires (not shown), which are embedded in the wall 10.

Figure 3:
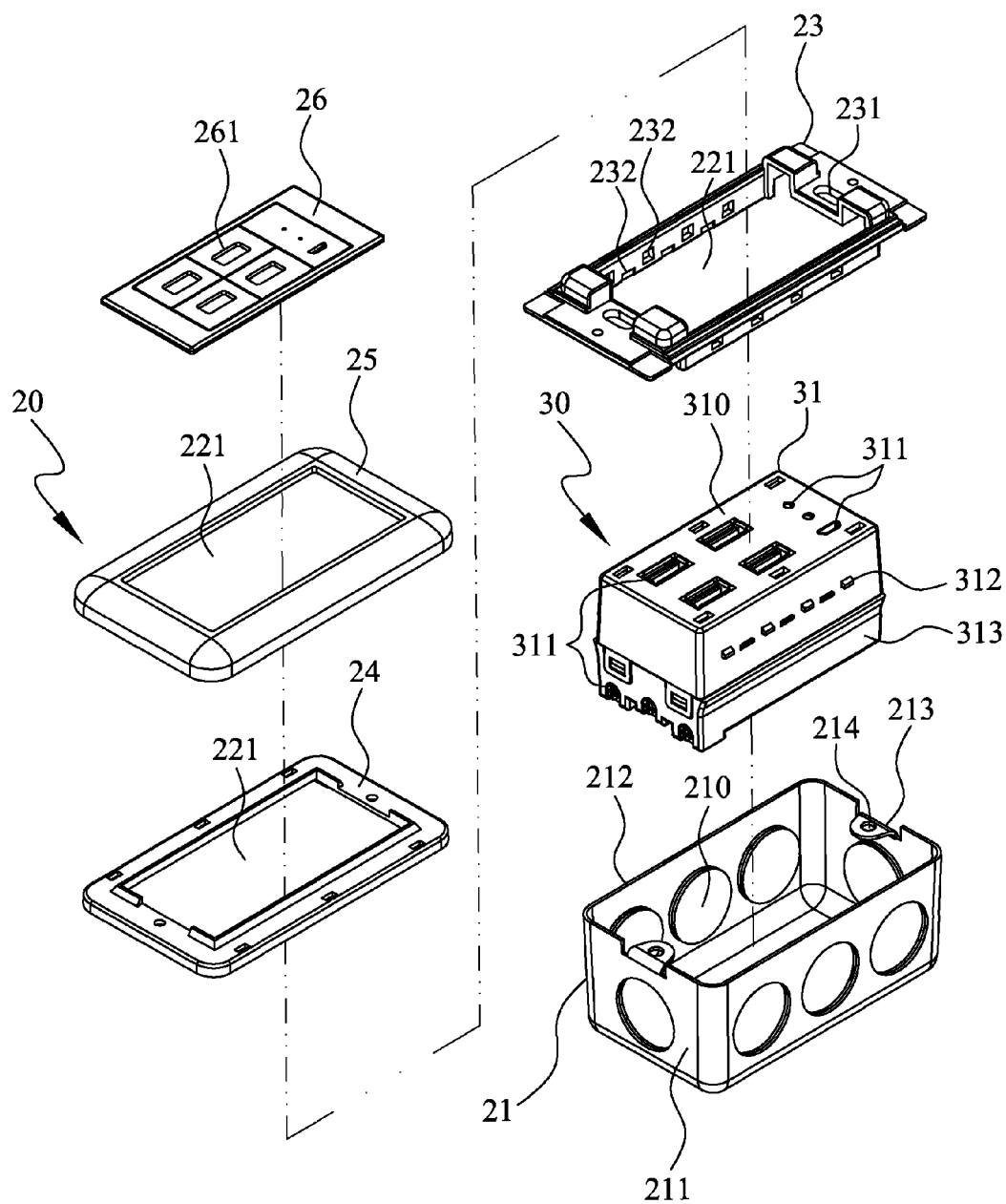
FIG. 3 is an exploded perspective view of a mounting case for the first preferred embodiment of the present invention, in which a combined USB hub and socket unit is held.

Please refer to FIG. 3. In the illustrated first preferred embodiment, the wall outlet type USB hub of the present invention includes a mounting case 20 and a combined USB hub and socket unit 30 held in the mounting case 20. The mounting case 20 includes a rear case portion 21 and a front case portion 22. The rear case portion 21 is configured for mounting in the above-mentioned recessed area 12 at the predetermined location 11 on the wall 10 and includes a peripheral wall 211. The peripheral wall 211 encloses a receiving space 210 therein and defines at a front side a first opening 212 facing toward an outer side of the wall 10. Two coupling tabs 213 are horizontally extended from two opposite front edges of the peripheral wall 211 and are respectively provided with a through hole 214.

The front case portion 22 is assembled to the first opening 212 of the rear case portion 21 and has a second opening 221, which is defined at a central area of the front case portion 22 to communicate with the first opening 212. In the illustrated first preferred embodiment, the front case portion 22 includes a back frame member 23, an intermediate frame member 24 and a front frame member 25. The back frame member 23 is located on a front side of the rear case portion 21 and provided with two coupling holes 231 corresponding to the through holes 214 of the coupling tabs 213 on the rear case portion 21. The back frame member 23 can be fixedly connected to the coupling tabs 213 by extending fastening elements through the coupling holes 231 and the through holes 214. For example, the fastening elements can be screws (not shown). The back frame member 23 can firmly hold the combined USB hub and socket unit 30 thereto via retaining means, which include a plurality of slots 232 formed on two opposite inner sides of the back frame member 23 facing toward the second opening 221. The slots 232 include two sets of differently sized slots, which are alternately arranged along the two opposite inner sides of the back frame member 23. The intermediate frame member 24 is correspondingly assembled to a front side of the back frame member 23. Similarly, the front frame member 25 is correspondingly assembled to a front side of the intermediate frame member 24.

Figure 4:
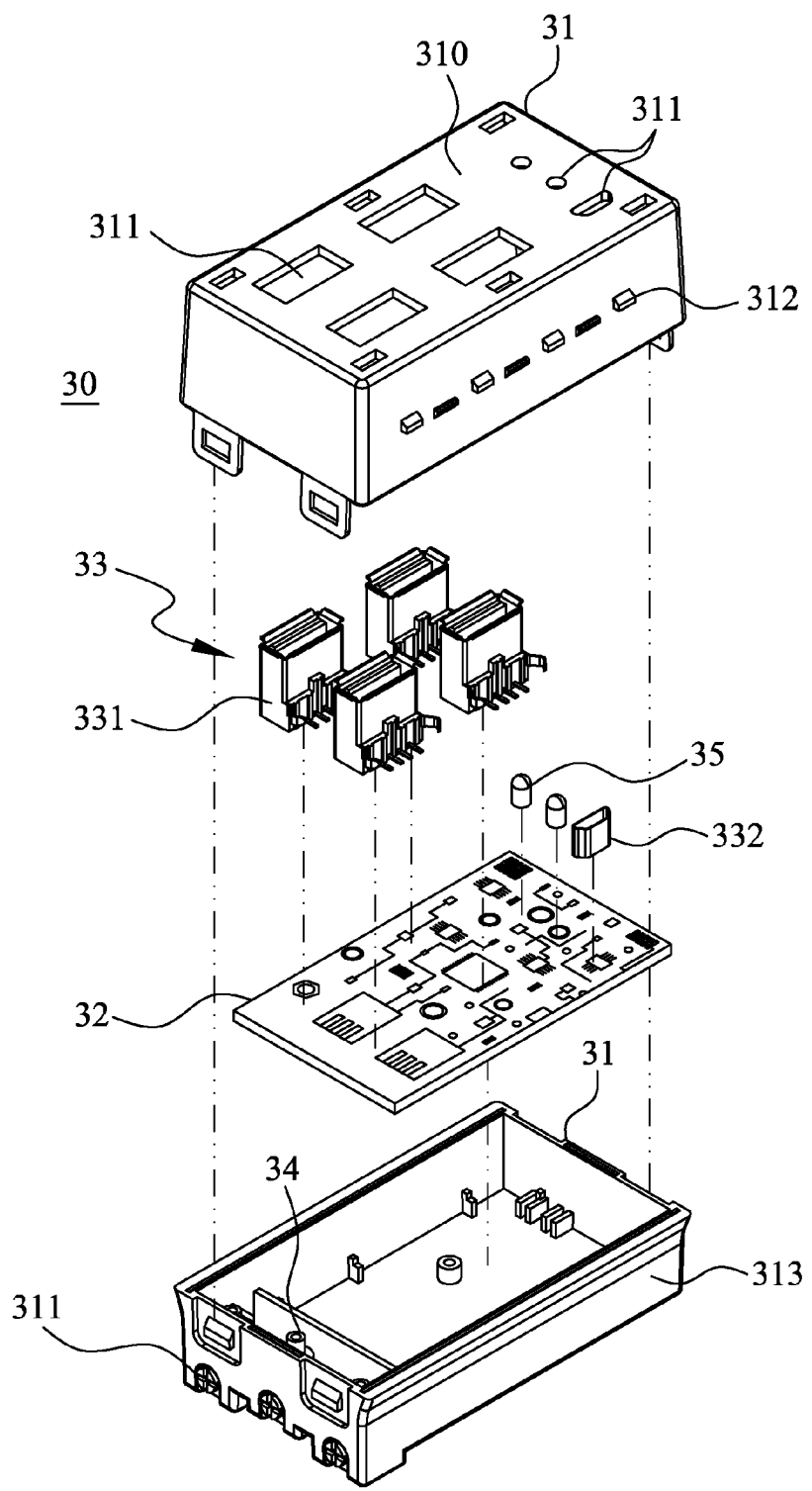
FIG. 4 is an exploded perspective view of the combined USB hub and socket unit shown in FIG. 3.

Please refer to FIG. 4. The combined USB hub and socket unit 30 is located in the receiving space 210 of the rear case portion 21, and mainly includes a housing member 31, a printed circuit board (PCB) 32, a plurality of data transfer ports 33, a power connector 34 and two light-emitting elements 35. The housing member 31 is provided on a front side with a plurality of openings 311 and on lateral outer sides with retaining means for holding it to the mounting case 20. In the illustrated first preferred embodiment, the housing member 31 includes a front housing portion 310 and a rear housing portion 313, which are coupled to each other. The front housing portion 310 is provided on a front side with four rectangular openings 311, two round openings 311, and a trapezoidal opening 311. The retaining means include a plurality of protrusions 312, which are formed on two opposite lateral outer sides of the front housing portion 310 and are shaped and located corresponding to the slots 232 formed on the back frame member 23 of the front case portion 22. The protrusions 312 also include two sets of differently sized protrusions, which are alternately arranged along the two opposite lateral outer sides of the front housing portion 310 corresponding to the differently sized and alternately arranged slots 232. The rear housing portion 313 is provided on a third lateral side with three arched openings.

Figure 5:
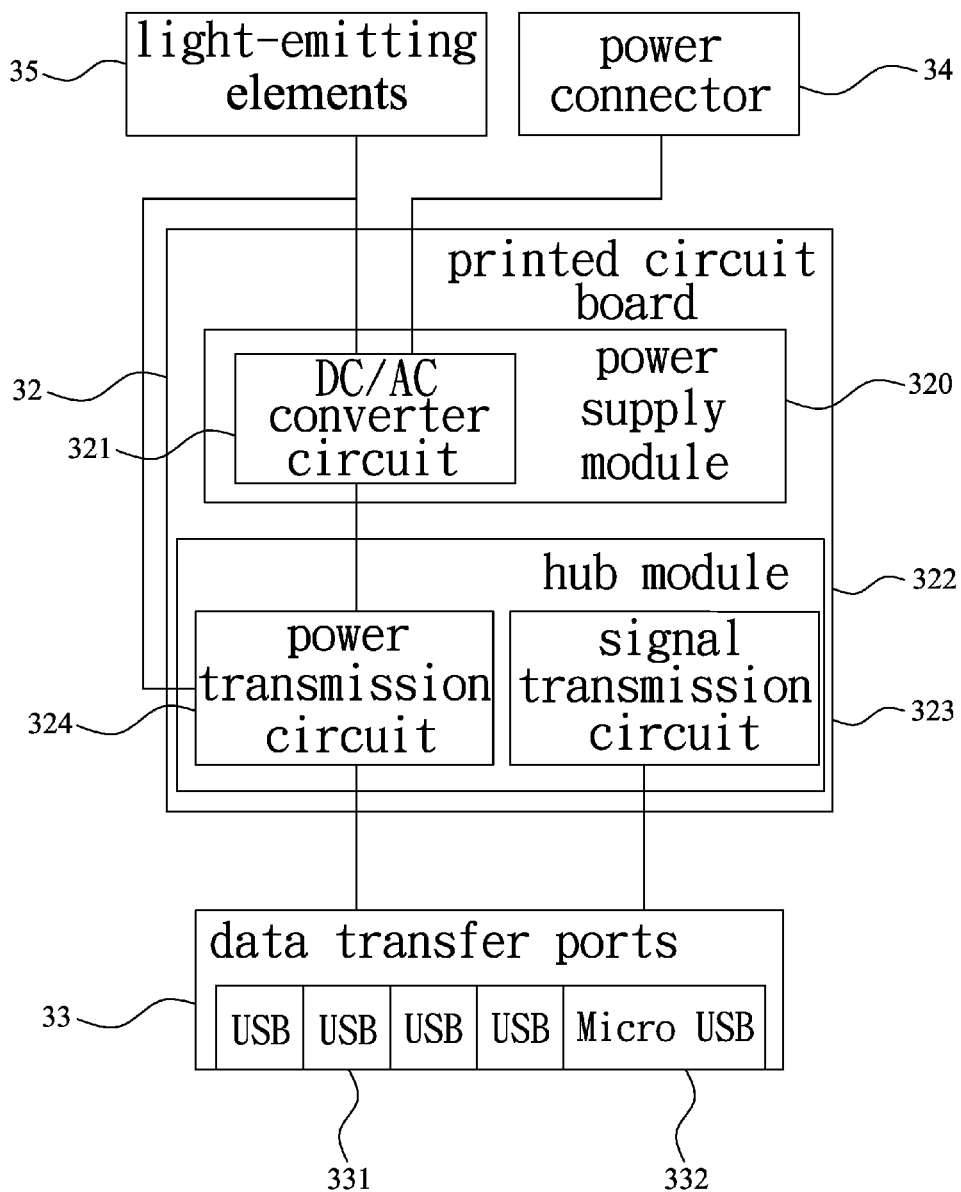
FIG. 5 is a block diagram showing an internal structure of the combined USB hub and socket unit according to the present invention.

Please refer to FIG. 5. The PCB 32 is located inside the housing member 31 and includes a power supply module 320 and a hub module 322. The power supply module 320 includes a DC/AC converter circuit 321. The hub module 322 includes a signal transmission circuit 323, and a power transmission circuit 324 electrically connected to the DC/AC converter circuit 321.

The data transfer ports 33 are located inside the housing member 31 and forward aligned with the rectangular openings 311 and the trapezoidal opening 311, and are electrically connected to the hub module 322 on the PCB 32. In the illustrated first preferred embodiment, the data transfer ports 33 include four USB ports 331 and one micro USB port 332. The micro USB port 332 is connected to a computer system to serve as a host, while all other USB ports 331 serve as transfer and charging ports for connecting to other external or peripheral devices. However, it is understood the first preferred embodiment is only illustrative to facilitate description of the present invention and not intended to limit the number, specification and combination of different ports. That is, the data transfer ports 33 may be otherwise set to be mini USB ports or other ports of different specifications according to actual need in use.

The power connector 34 is located inside the housing member 31, and is electrically connected at an end to the PCB 32. The other end of the power connector 34 is arranged to align with one of the arched openings on the rear housing portion 313 for electrically connecting with the power wires (not shown) embedded in the predetermined location 11 on the wall 10.

The light-emitting elements 35 are similarly located inside the housing member 31 to electrically connect to the PCB 32 while being arranged to align with and face toward the round openings 311 on the front housing portion 310. In an operable embodiment of the present invention, the light-emitting elements 35 can be light emitting diodes. When the power connector 34 is electrically connected to the external power wires, one of the light-emitting elements 35 will illuminate accordingly to indicate the wall outlet type USB hub is in an energized state. The other light-emitting element 35 is used to indicate whether there is any other device connected to the host, i.e. the micro USB port 332 on the combined USB hub and socket unit 30 of the wall outlet type USB hub.

The mounting case 20 may further include a cover plate 26 for covering the second opening 221 on the front case portion 22. The cover plate 26 is provided with a plurality of windows 261, which match and are communicable with the openings 311 on the front side of the front housing portion 310. The front case portion 22 and the cover plate 26 together give the wall outlet type USB hub of the present invention a flush front surface and accordingly an esthetic overall appearance. In the illustrated first preferred embodiment, the windows 261 also include four rectangular windows, two round windows and one trapezoidal window.

Figure 6:
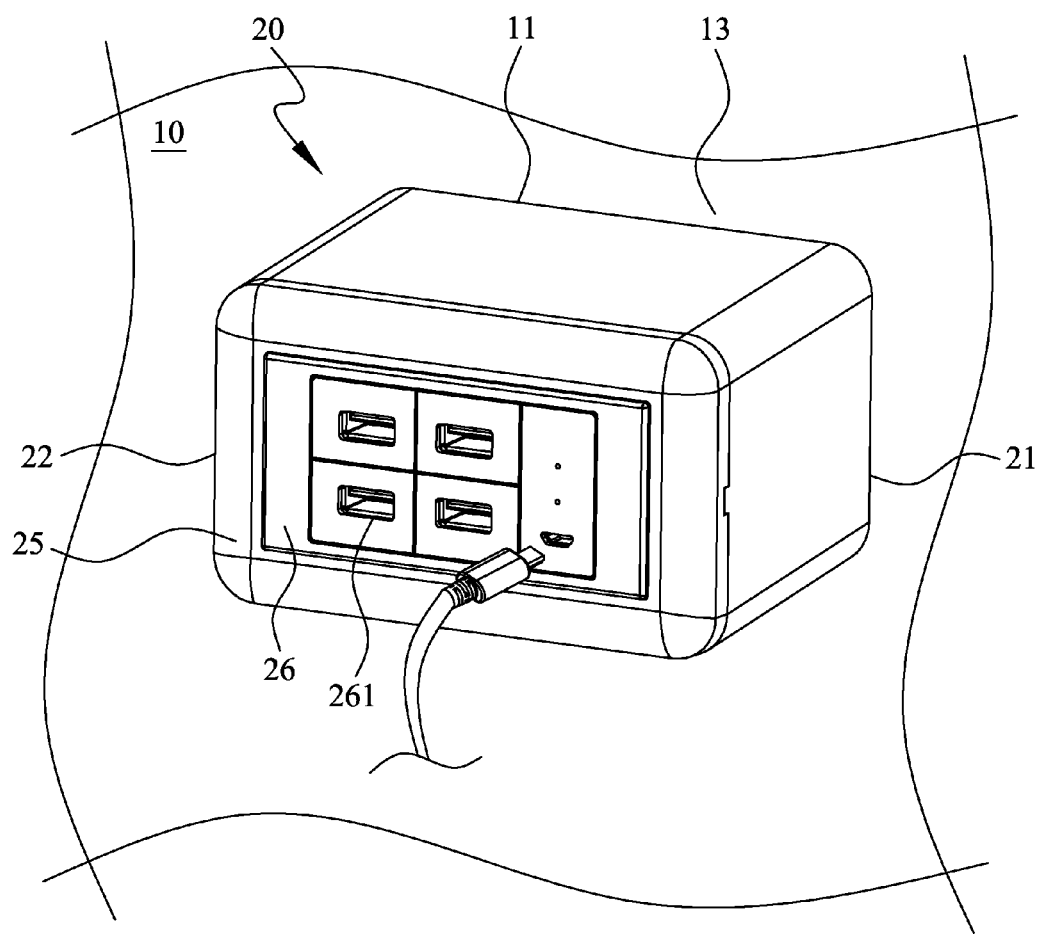
FIG. 6 is an assembled perspective view of a wall outlet type USB hub according to a second preferred embodiment of the present invention, showing a micro USB plug is connected thereto.

Please refer to FIG. 6. A wall outlet type USB hub according to a second preferred embodiment of the present invention is configured for mounting on a wall 10 at a predetermined location 11, which is a flush wall surface 13. In this case, the rear case portion 21 is directly fixed onto the flush wall surface 13 of the wall 10, and the peripheral wall 211 of the rear case portion 21 is so designed that it together with the front case portion 22 form an integral mounting case 20 having flush joints. Since all other structural designs of the second preferred embodiment are the same as the first preferred embodiment, they are not repeatedly discussed herein.

Figure 7:
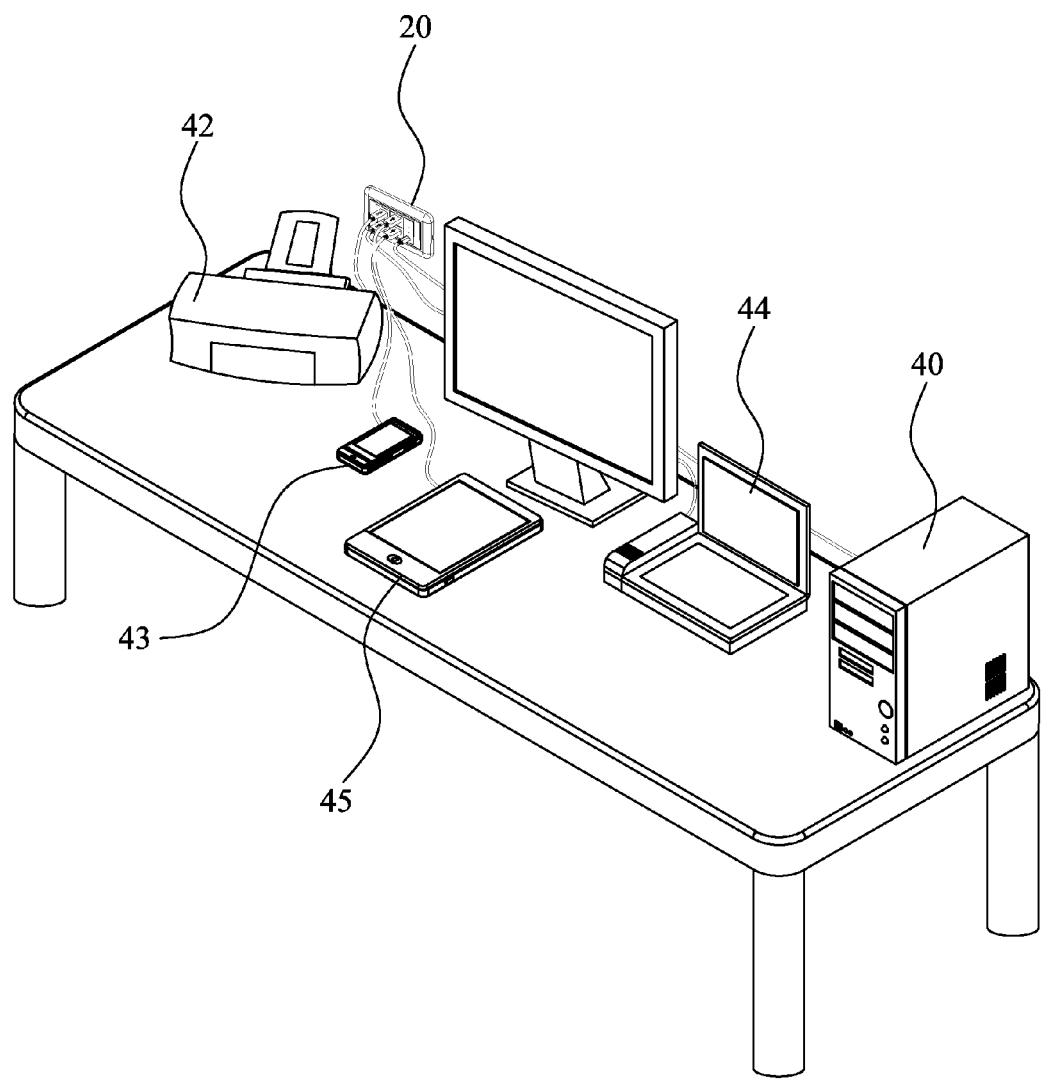
FIG. 7 shows the wall outlet type USB hub with independent charging function according to the present invention is connected to a host system, which is a computer in this example, and has many different 3C products connected thereto.
Figure 8:
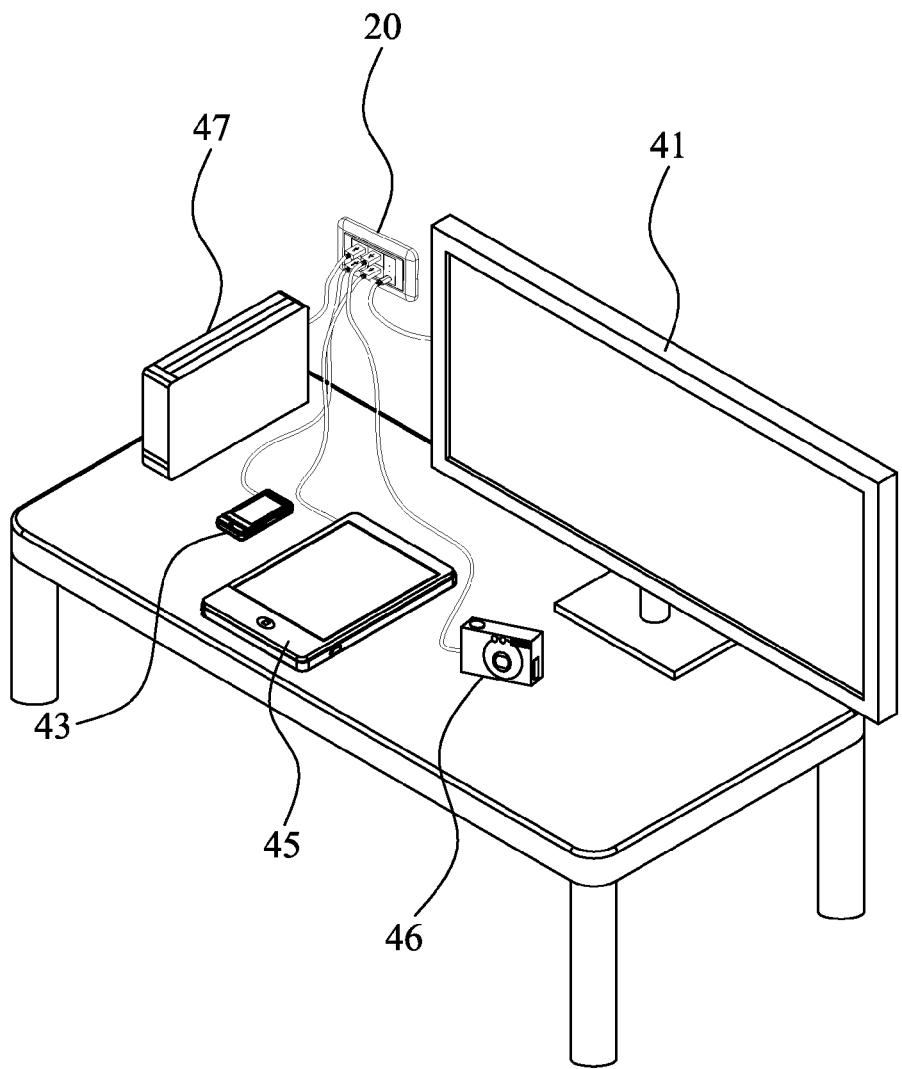
FIG. 8 shows the wall outlet type USB hub with independent charging function according to the present invention is connected to a host system, which is a digital TV in this example, and has many different 3C products connected thereto.

FIGS. 7 and 8 show the use of the wall outlet type USB hub according to the present invention. When the wall outlet type USB hub is mounted on the wall 10 and connected to the embedded power wires, one of the light-emitting elements 35 will illuminate to indicate the wall outlet type USB hub has electric power supplied thereto. Then, a computer system 40 or a digital TV 41 can be connected to the micro USB port 322 that serves as a host, and other electronic devices, such as a printer 42, a cell phone 43, a scanner 44, a tablet computer 45, a digital camera 46, a portable hard disk 47, an MP3/4/5, a power bank, a card reader or the like, can be correspondingly connected to the four USB ports 331, which serve as data transfer and charging ports, so as to enable data transmission or device charging. The wall outlet type USB hub with independent charging function according to the present invention allows data transmission between different electronic devices connected thereto while charging these electronic devices and therefore provides increased value in use. Further, the wall outlet type USB hub according to the present invention matches the specification of the cover plate for the AC wall outlet in general residential and office buildings and can therefore replace the existing AC wall outlet and be directly mounted in the cavity behind the cover plate of the old AC wall outlet without the need of additionally designing any cover plate with particular specifications. Thus, the present invention provides largely increased usability and conveniences in charging and data transfer among different electronic devices.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A wall outlet type USB hub with independent charging function for mounting on a wall at a predetermined location, comprising:
    a mounting case including:
        a rear case portion being mounted to the predetermined location on the wall and having a peripheral wall enclosing a receiving space therein, and the peripheral wall defining a first opening facing toward an outer side of the wall; and
        a front case portion being assembled to the first opening of the rear case portion, and having a second opening defined at a central area thereof to communicate with the first opening; and
    a combined USB hub and socket unit being held in the receiving space of the rear case portion, and including:
        a housing member being provided on a front side with a plurality of openings and on lateral outer sides with retaining means for holding the housing member to the mounting case;
        a printed circuit board (PCB) being located inside the housing member and including a power supply module and a hub module; the power supply module having a DC/AC converter circuit, and the hub module having a signal transmission circuit and a power transmission circuit, which is electrically connected to the DC/AC converter circuit;
        a plurality of data transfer ports being located inside the housing member and forward aligned with the openings on the housing member, and being electrically connected to the hub module on the PCB; and
        a power connector being located inside the housing member and electrically connected to the power module on the PCB.

2. The wall outlet type USB hub as claimed in claim 1, wherein the predetermined location on the wall is a recessed area receded from the wall's surface and having a front opening, and the rear case portion being mounted in the recessed area.

3. The wall outlet type USB hub as claimed in claim 1, wherein the predetermined location on the wall is a flush wall surface, and the rear case portion being fixed onto the flush wall surface.

4. The wall outlet type USB hub as claimed in claim 1, wherein the retaining means are located between the second opening of the front case portion and the lateral outer sides of the housing member.

5. The wall outlet type USB hub as claimed in claim 4, wherein the retaining means include a plurality of slots formed on inner sides of the front case portion facing toward the second opening, and a plurality of protrusions formed on the lateral outer sides of the housing member corresponding to the slots.

6. The wall outlet type USB hub as claimed in claim 5, wherein the slots include two sets of differently sized slots, which are alternately arranged along the inner sides of the front case portion; and the protrusions include two sets of differently sized protrusions, which are alternatively arranged along the lateral outer sides of the housing member corresponding to the differently sized slots.

7. The wall outlet type USB hub as claimed in claim 1, wherein the mounting case further includes a cover plate for covering the second opening of the front case portion; and the cover plate being provided with a plurality of windows matching and communicable with the openings on the front side of the housing member.

8. The wall outlet type USB hub as claimed in claim 1, wherein the combined USB hub and socket unit further includes at least one light-emitting element; the at least one light-emitting element being located inside the housing member and forward aligned with at least one of the openings formed on the front side of the housing member, and being electrically connected to the PCB.

9. The wall outlet type USB hub as claimed in claim 1, wherein the data transfer ports are selected from the group consisting of USB ports, mini USB ports, micro USB ports, and any combination thereof.

10. A wall outlet type USB hub with independent charging function for mounting in a mounting case fixed onto a wall, comprising:
    a housing member being provided on a front side with a plurality of openings and on lateral outer sides with retaining means for holding the housing member to the mounting case;
    a printed circuit board (PCB) being located inside the housing member, and including a power supply module having a DC/AC converter circuit and a hub module having a signal transmission circuit and a power transmission circuit; and the power transmission circuit being electrically connected to the DC/AC converter circuit;
    a plurality of data transfer ports being located inside the housing member and forward aligned with the openings on the front side of the housing member, and being electrically connected to the hub module on the PCB; and
    a power connector being located inside the housing member and electrically connected to the power module on the PCB, wherein the retaining means include a plurality of slots formed on inner sides of the mounting case, and a plurality of protrusions formed on the lateral outer sides of the housing member corresponding to the slots, wherein the slots include two sets of differently sized slots, which are alternately arranged along the inner sides of the mounting case; and the protrusions include two sets of differently sized protrusions, which are alternatively arranged along the lateral outer sides of the housing member corresponding to the differently sized slots.

11. The wall outlet type USB hub as claimed in claim 10, further comprising at least one light-emitting element; and the at least one light-emitting element being located inside the housing member and forward aligned with at least one of the openings formed on the front side of the housing member, and being electrically connected to the PCB.

12. The wall outlet type USB hub as claimed in claim 10, wherein the data transfer ports are selected from the group consisting of USB ports, mini USB ports, micro USB ports, and any combination thereof.

* * * * *